United States Patent
Fakhrai et al.

(10) Patent No.: US 9,203,496 B2
(45) Date of Patent: Dec. 1, 2015

(54) DYNAMIC ALLOCATION OF TRANSCEIVERS AND FREQUENCY CHANNELS IN MIMO SYSTEMS

(75) Inventors: Delaram Fakhrai, Laguna Beach, CA (US); Mehran Moshfeghi, Rancho Palos Verdes, CA (US)

(73) Assignee: GOLBA LLC, Rancho Palos Verdes, CA (US)

( * ) Notice: Subject to any disclaimer, the term of this patent is extended or adjusted under 35 U.S.C. 154(b) by 948 days.

(21) Appl. No.: 13/295,517

(22) Filed: Nov. 14, 2011

(65) Prior Publication Data

US 2012/0120998 A1 May 17, 2012

Related U.S. Application Data

(60) Provisional application No. 61/413,389, filed on Nov. 12, 2010.

(51) Int. Cl.
| | |
|---|---|
| H04B 7/06 | (2006.01) |
| H04B 7/04 | (2006.01) |
| H04L 1/00 | (2006.01) |
| H04L 5/06 | (2006.01) |
| H04L 1/06 | (2006.01) |

(52) U.S. Cl.
CPC .......... *H04B 7/0689* (2013.01); *H04B 7/0413* (2013.01); *H04L 1/0015* (2013.01); *H04L 5/06* (2013.01); *H04B 7/0669* (2013.01); *H04L 1/0026* (2013.01); *H04L 1/0618* (2013.01)

(58) Field of Classification Search
CPC .... H04B 7/024; H04B 7/0413; H04B 7/0452; H04B 7/0495
See application file for complete search history.

(56) References Cited

U.S. PATENT DOCUMENTS

| | | | |
|---|---|---|---|
| 6,532,224 B1* | 3/2003 | Dailey ......................... | 370/337 |
| 7,729,233 B2* | 6/2010 | Webster et al. ............... | 370/204 |
| 8,228,809 B1* | 7/2012 | Xing et al. .................... | 370/252 |
| 8,811,245 B2* | 8/2014 | Rohfleisch et al. ........... | 370/310 |
| 2013/0195467 A1* | 8/2013 | Schmid et al. ............... | 398/115 |

* cited by examiner

Primary Examiner — Alvin Zhu
(74) Attorney, Agent, or Firm — Adeli LLP

(57) ABSTRACT

A communication system is provided that switches the communication of multi-antenna transmitter and receiver terminals between MIMO and frequency-bundle modes. In MIMO mode all transmitter and receiver antennas operate in the same frequency channel while in frequency-bundle mode each pair of one transmitter antenna and one receiver antenna is tuned to a different frequency channel. The communication system includes one or more control modules that collect, analyze, and apply configurations to the terminals and switch the operation of one or more transmit/receive terminal pairs between the MIMO and frequency-bundle modes based on the collected information and metrics. The monitored information and metrics include the availability of idle frequency channels in the available frequency band, propagation channel conditions, peak throughput demand by different users, power consumption budget and battery lives of different terminals, distance between transmitter and receiver antennas in each communicating transmitter/receiver pair, and overall traffic demand by terminals.

33 Claims, 11 Drawing Sheets

DYNAMIC ALLOCATION OF TRANSCEIVERS AND FREQUENCY CHANNELS IN MIMO SYSTEMS

CLAIM OF BENEFIT TO PRIOR APPLICATIONS

The present Application claims the benefit of U.S. Provisional Patent Application 61/413,389, entitled, "Methods for Dynamically Allocating Transceivers and Frequency Channels in MIMO Systems," filed Nov. 12, 2010. The contents of U.S. Provisional Application 61/413,389 are hereby incorporated by reference.

BACKGROUND

Multi-Input Multi-Output (MIMO) systems have been used in recent years to increase bandwidth efficiency of wireless communication systems. In such systems, M transmit chains/antennas are utilized at the transmitting end, whereas N receiver chains/antennas are utilized at the receiving end. All transmitting antennas {1, ..., M} and all receiving antennas {1, ..., N} are tuned to the same carrier frequency (i.e., channel). In other words, the transmit frequencies {ftx1, ..., ftxM} and the receive frequencies {frx1, ..., frxN} are all set to the same frequency.

It has been established that under ideal conditions, MIMO systems exploit spatial diversity and propagation richness to increase throughput capacity by a factor of min (M,N) compared to a comparable single-input single-output (SISO) system. This is achieved by different methods of MIMO processing such as spatial multiplexing and space-time diversity coding. In MIMO implementations today, all available transmit/receive chains are configured to the same carrier frequency (i.e., the same channel). The literature on design, optimization, analysis, and implementation of MIMO systems is based on the above assumption. That's because they attempt at optimizing the spectrum efficiency over the occupied frequency channel. Additionally, all recent and under-development wireless standards today consider MIMO operations as described above.

MIMO wireless systems use different coding schemes to exploit their multiple transmit/receive antennas to improve performance and throughput. In one usage scenario, space-time diversity coding schemes are used to encode data streams that are transmitted over different antennas. The primary purpose of space-time diversity coding is to provide spatial diversity gain by transmitting copies of the same data stream over different antennas (hence diversity against channel fading on a set of antennas). In a multiplexing usage scenario, multiple antennas are utilized to transmit multiple data streams over the same frequency channel (hence higher throughput). Similarly, coding schemes designed for spatial multiplexing are used to enable and improve the multiplexing usage scenario.

In scenarios where available spectrum is divided into sub-channels (i.e., K channels of {CH_1, CH_2, ..., CH_K}), a MIMO system is configured such that all transmit/receive antennas are tuned to one channel out of available channels. There are several limitations and shortcomings with the above mode of operation used in today's MIMO systems. One such limitation is that the increase in capacity by factor of min (M,N) is only achieved if the channel response between different pairs of transmit (TX) and receiver (RX) antennas are uncorrelated. In other words, the channel response between $i^{th}$ transmit antenna and $j^{th}$ receive antenna is uncorrelated with respect to other channel responses for i={1, ..., M} and j={1, ..., N}. As the correlation between the propagation channels increases, the promised capacity by MIMO processing rapidly decreases.

Uncorrelated propagation channels are typically present in scatterer-rich environment and where there is no strong dominant line-of-sight. For instance, the promised capacity substantially decreases in the following common cases: i) where there is a line-of-sight (LOS) between the transmitter and receiver sides, ii) the transmitter and receiver sides are relatively close together, iii) the reflective environment surrounding the link is not scatterer-rich. The ability to transmit min (M,N) streams of data over the same frequency band relies heavily on independence between the channels experienced by each data stream. A mathematical analysis where the MIMO channel capacity is characterized as a function of correlation between channels is discussed in Emre Telatar, "Capacity of multi-antenna Gaussian channels," European Transactions on Telecommunications, vol. 10, num. 6, pp. 585-596, 1999 which is incorporated herein by reference.

Another limitation is in multiple-access scenarios (which is the most common scenario in practice), the available sub-channels {CH_1, CH_2, ..., CH_K} are typically shared by multiple users, where each user (both transmit/receive sides) is assigned one frequency channel (CH_i, i=1, ..., K) at any given time period. However, depending on the traffic load and the number of active users accessing the channels in a geographic area, multiple channels {CH_i} could become available at different time periods. These multiple available channels are, however, not assigned to a single user to instantly increase its bandwidth and capacity.

BRIEF SUMMARY

Some embodiments provide a Multi-Input Multi-Output (MIMO) communication system that includes one or more transmitter terminals (or transmitter devices) and one or more receiver terminals (or receiver devices). Each transmitter terminal deploys several transmit chains. Each transmit chain includes an antenna, an up-conversion module, and a transmitter. Each receiver terminal deploys several receive chains. Each receiver chain includes an antenna, a down-conversion module, and a receiver. A transmitter terminal with M transmit chains that communicates with a receiver terminal with N receive chains is referred to as an M×N MIMO system (M transmit, N receive antennas). As an example, the transmitter terminal (or device) can be a laptop (with M transmit antennas embedded) and the receiver terminal (or device) can be a TV (with N receive antennas), where the laptop is streaming high-quality video to the TV set.

In some embodiments, the available frequency band is divided into several frequency channels to allow multiple-access by multiple users. These frequency channels are shared by the user terminals (or devices) operating in this band. The disclosed communication system has the capability to switch to full MIMO mode in which all transmitters of a transmitter terminal and all receivers of a receiver terminal that communicate with each other operate in the same frequency channel. Some embodiments operate a pair of transmit and receive terminals in MIMO mode when a limited number of frequency channels are available or when other frequency channels are occupied by other user terminals. In this mode maximum performance is achieved by means of MIMO communication schemes such as space-time coding, spatial multiplexing, etc.

The disclosed communication system also has the capability to operate in a frequency-bundle mode. In this configuration, each pair of one transmitter antenna and one receiver antenna is tuned to a different frequency channel in the available frequency band. In some embodiments, the frequency-bundle mode is used when there are idle frequency channels available. In this mode, maximum performance (throughput, range, reliability, etc.) is achieved by means of operating transmit/receive antennas/chains concurrently but each at a different frequency channel.

The disclose communication system is also capable of operating in a hybrid mode which is a combination of the MIMO and frequency-bundle modes, where a subset of transceiver chains operate concurrently over the same frequency channel and other subsets of individual transceiver chains operate over different frequency channels.

In some embodiments, the communication system includes one or more control modules that collect, analyze, and apply configurations to the terminals in the network. This functionality in different embodiments is provided at one or more locations such as at the transmitter terminal, at the receiver terminal, or at a central location. The control modules monitor a set of information elements and metrics and switch the operation of one or more transmit/receive terminal pairs between the MIMO mode and the frequency-bundle or hybrid modes. The monitored information and metrics include the availability of frequency channels in the available frequency band for use in frequency-bundle mode, propagation channel conditions and responses, peak throughput demand by different users (or terminals), power consumption budget and battery lives of different terminals, distance between transmitter and receiver antennas in each communicating transmit/receive pair, overall traffic demand by terminals, etc.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
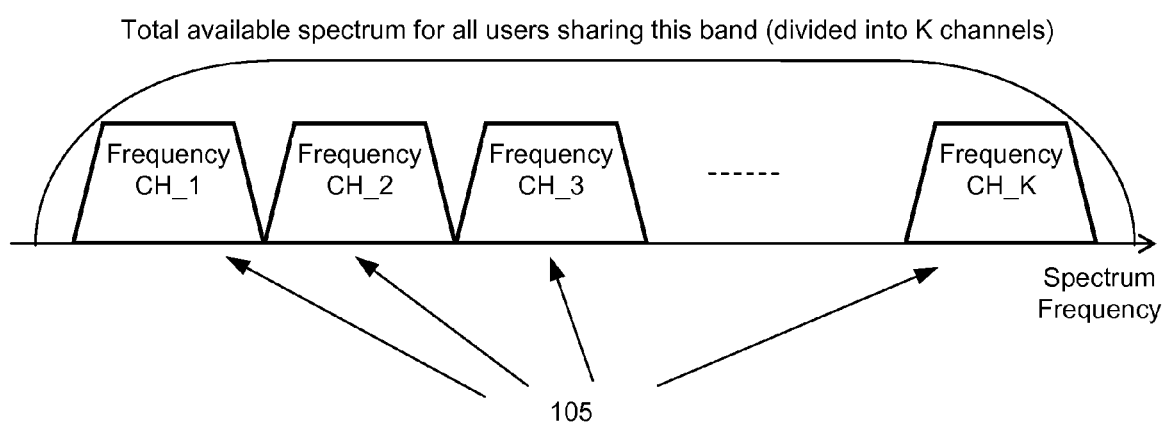
FIG. 1 conceptually illustrates a frequency band divided into K sub-channels to allow multiple-access by multiple users.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a Multi-Input Multi-Output (MIMO) communication system that includes one or more transmitter terminals (or transmitter devices) and one or more receiver terminals (or receiver devices). Each transmitter terminal deploys several transmit chains. Each transmit chain includes an antenna, an up-conversion module, and a transmitter. Each receiver terminal deploys several receive chains. Each receiver chain includes an antenna, a down-conversion module, and a receiver. A transmitter terminal with M transmit chains that communicates with a receiver terminal with N receive chains is referred to as an M×N MIMO system (M transmit, N receive antennas). As an example, the transmitter terminal (or device) can be a laptop (with M transmit antennas embedded) and the receiver terminal (or device) can be a TV (with N receive antennas), where the laptop is streaming high-quality video to the TV set.

In some embodiments, the available frequency band is divided into several frequency channels to allow multiple-access by multiple users. These frequency channels are shared by the user terminals (or devices) operating in this band. The disclosed communication system has the capability to switch to full MIMO mode in which all transmitters of a transmitter terminal and all receivers of a receiver terminal that communicate with each other operate in the same frequency channel. Some embodiments operate a pair of transmit and receive terminals in MIMO mode when a limited number of frequency channels are available or when other frequency channels are occupied by other user terminals. In this mode maximum performance is achieved by means of MIMO communication schemes such as space-time coding, spatial multiplexing, etc.

The disclosed communication system also has the capability to operate in a frequency-bundle mode. In this configuration, each pair of one transmitter antenna and one receiver antenna is tuned to a different frequency channel in the available frequency band. In some embodiments, the frequency-bundle mode is used when there are idle frequency channels available. In this mode, maximum performance (throughput, range, reliability, etc.) is achieved by means of operating transmit/receive antennas/chains concurrently but each at a different frequency channel.

The disclose communication system is also capable of operating in a hybrid mode which is a combination of the MIMO and frequency-bundle modes, where a subset of transceiver chains operate concurrently over the same frequency channel and other subsets of individual transceiver chains operate over different frequency channels.

In some embodiments, the communication system includes one or more control modules that collect, analyze, and apply configurations to the terminals in the network. This functionality in different embodiments is provided at one or more locations such as at the transmitter terminal, at the receiver terminal, or at a central location. The control modules monitor a set of information elements and metrics and switch the operation of one or more transmit/receive terminal pairs between the MIMO mode and the frequency-bundle or hybrid modes. The monitored information and metrics include the availability of frequency channels in the available frequency band for use in frequency-bundle mode, propagation channel conditions and responses, peak throughput demand by different users (or terminals), power consumption budget and battery lives of different terminals, distance between transmitter and receiver antennas in each communicating transmit/receive pair, overall traffic demand by terminals, etc. Several more embodiments are described below.

I. Different Modes of Operation

Some embodiments provide a system that switches between three modes of operation as described below. FIG. 1 conceptually illustrates a frequency band divided into K sub-channels 105 to allow multiple-access by multiple users. The figure shows the frequency channelization of the spectrum. As shown, the overall band is divided into K frequency channels. These frequency channels $\{CH\_1, CH\_2, \ldots, CH\_K\}$ are shared by the terminals/users operating in this band.

Figure 2:
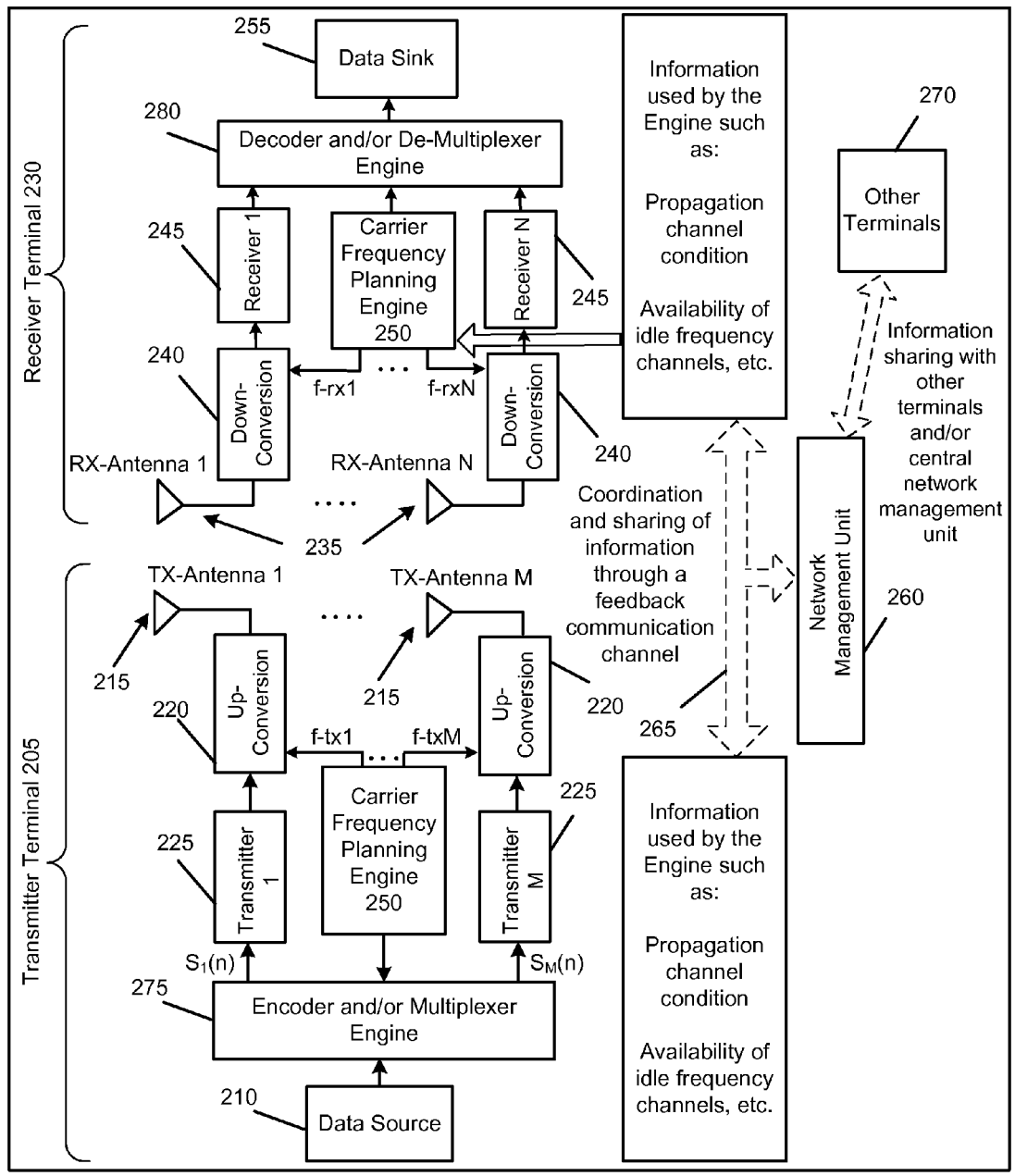
FIG. 2 conceptually illustrates a top level diagram of some embodiments of the invention.

FIG. 2 conceptually illustrates a top level diagram of a communication system of some embodiments of the invention. The figure shows a transmitter terminal (or transmitter device) 205 and a receiver terminal (or receiver device) 230 and their internal details. In some embodiment, each terminal has both transmission and reception capabilities in order to support two-way wireless link which is required for all typical communications. In some embodiments, special terminals that only feature transmission or reception capability are utilized. Throughout this specification, the term transmitter terminal refers to a terminal in transmission mode and receiver terminal refers to a terminal in reception mode, although each terminal might be capable of either one way or two way communication. For simplicity, when describing a terminal in transmission mode, only the details regarding the transmitter side of the terminal are described. Similarly, when describing a terminal in reception mode, only the details regarding the receiver side of the terminal are described.

The transmitter terminal 205 is deploying M transmit antennas 215, while the receiver terminal 230 is deploying N receive antennas 235. The pair of the transmitter/receiver terminals are referred to as an M×N MIMO system (M transmit, N receive antennas). In this specification, a terminal is any device or user equipment that is capable of communicating with other devices through wireless channels. For instance, the transmitter terminal can be a laptop (with M transmit antennas embedded) and the receiver terminal can be a TV (with N receive antennas), where the laptop is streaming high-quality video to the TV set. The network also has other terminals that want to use the available frequency channels. The "other terminals" block 270 in the figure depicts all other terminals in the network that are operating or want to operate in one of the $\{CH\_1, CH\_2, \ldots, CH\_K\}$ frequency channels.

As shown, the transmitter terminal 205 has M transmitter antennas/branches (or antennas/chains). Each branch includes an antenna 215, an up-conversion module 220, and a transmitter 225. In some embodiments, each transmit branch can tune to any frequency channels available in the band of operation $\{CH\_1, CH\_2, \ldots, CH\_K\}$. The up-conversion frequencies used by different branches in the transmitter terminal are represented by $\{f\text{-}tx1, \ldots, f\text{-}txM\}$. Individual up-conversion frequencies of $\{f\text{-}tx1, \ldots, f\text{-}txM\}$ can take on any value from the set of $\{CH\_1, CH\_2, \ldots, CH\_K\}$.

The "data source" 210 represents any data provided by higher layers (not shown) of the communication system to be transmitted to the receiving terminal. Different encoding and multiplexing methods are used in different embodiments to transport this "data" over the M transmit branches and antennas. The "data source" 210 shows the source of information bits that are transmitted by the transmitter terminal. For example, the "data source" can be an audio/video data source, hard-drive storage, etc. The "Encoder and/or multiplexer engine" 275 represents the overall function that performs MIMO encoding (either space-time diversity encoding or spatial multiplexing depending on the mode of operation).

At the receiver terminal 230, N antennas and receiver branches are utilized. Each branch includes an antenna 235, a down-conversion module 240, and a receiver 245. The down-conversion frequencies used by different branches in the receiver terminal are represented by $\{f\text{-}rx1, \ldots, f\text{-}rxN\}$. Individual down-conversion frequencies of $\{f\text{-}rx1, \ldots, f\text{-}rxN\}$ can take on any value from the set of $\{CH\_1, CH\_2, \ldots, CH\_K\}$. At the receiver terminal 230, the received data over the N receive branches are decoded and combined (corresponding to the scheme used at the transmitter side) to reconstruct the original data provided by "data source" 210. The "Decoder and/or de-multiplexer engine" 280 represents the overall function that performs MIMO decoding (either space-time diversity decoding or spatial de-multiplexing depending on the mode of operation). The "data sink" 255 shows the consumption point of information bits that are received by the receiver terminal 230. For example, the "data sink" can be a hard-drive storage, a video display port, etc.

The communication system of FIG. 2 also includes a network management engine that collects, analyzes, and applies configurations to the terminals in the network. The network management engine includes one or more control modules in some embodiments. The functionality of the network management engine in different embodiments is included at the transmitter terminal (as shown by carrier frequency planning engine 250 at the transmitter terminal), at the receiver terminal (as shown by carrier frequency planning engine 250 at the receiver terminal), at a central location (as shown by network management unit 260), or a combination thereof.

The control module "network management unit" 260 of the network management engine collects and processes relevant information and metrics that can impact the optimal allocation of frequency resources among the terminals in the network. The "network management unit" 260 combines this information with the availability of frequency channels to re-configure the network resources. Such relevant information supplied by the terminals includes (but not limited to) propagation channel measured by each terminal, throughput requirements desired by each terminal, quality-of-service requirements, etc. The information and metrics collected from different terminals in the network is communicated to the "network management engine" through a "feedback communication channel" 265. In some embodiments, the "feedback communication channel" is a dedicated low-throughput communication channel.

The control module "carrier frequency planning engine" 250 of the network management engine dynamically collects information and decides how to configure the up-conversion frequencies {f-tx1, ..., f-txM} and down-conversion frequencies {f-rx1, ..., f-rxN}. In some embodiments, at least a portion of information collected by "carrier frequency planning engine" 250 is received from the network management unit 260. In some embodiments, the frequencies {f-tx1, ..., f-txM} and {f-rx1, ..., f-rxN} are generated by frequency synthesizers and applied through frequency mixers in analog/radio-frequency domains.

In some embodiments in which the network management engine includes both the network management unit and the carrier frequency planning engine, the network management unit 260 covers the data collection and the decision making process that requires input from all the terminals in the network. On the other hand, the carrier frequency planning engine 250 applies the MIMO/frequency-bundle configurations within each terminal by programming the down-conversion/up-conversion frequencies based on the decided configurations. In other embodiments, all these data collection and decision makings are done by one control module.

In some embodiments, a communication system with multiple transceiver chains dynamically switches between three operation modes: MIMO mode, frequency-bundle mode, and hybrid mode. These modes of operation are described in the following sub-sections.

A. MIMO Mode

Figure 3:
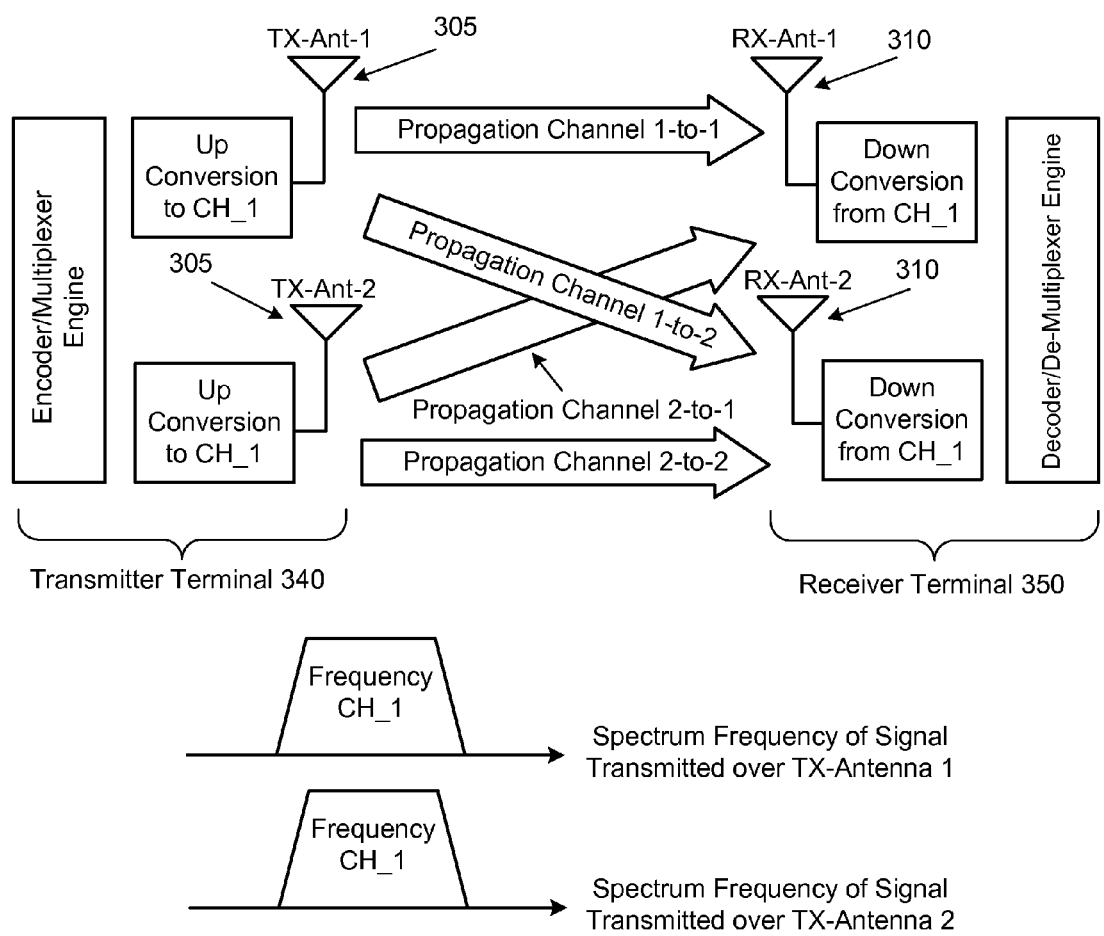
FIG. 3 conceptually illustrates a 2×2 multi-antenna system configured into MIMO mode where both antennas are transmitting in the same frequency channel in some embodiments.

In this mode all transmitting and receiving antennas/chains are configured and tuned to one frequency channel from {CH_1, CH_2, ..., CH_K} and all operate over the same band simultaneously. Different MIMO coding schemes (space-time and others) are utilized in this mode of operation. FIG. 3 conceptually illustrates a 2×2 multi-antenna system in some embodiments that is configured into MIMO mode where both transmitting antennas are transmitting in the same frequency channel CH_1. The figure shows one transmitter terminal 340 and one receiver terminal 350. The figure is similar to the scenario that is depicted in FIG. 2 except that the MIMO pair in FIG. 3 corresponds to a 2×2 MIMO system versus the general M×N MIMO system in FIG. 2.

At the receiver side, each antenna 310 receives signals from both transmitting antennas 305. The data streams transmitted over the two transmitter chains/antennas can be coded (space-time or frequency-time) to allows maximum capacity improvement and ease of decoding at the receiver side. One of ordinary skill in the art would realize that while FIG. 3 shows an example 2×2 configuration a more general configuration with M transmitter antenna and N receiver antenna is possible.

B. Frequency-Bundle Mode

Without loss of generality and for ease of presentation, assume an N transmitter and N receiver configuration (the case where numbers of transmit and receive antennas are not equal is addressed in the next sub-section). In this configuration, each pair of one transmitter antenna chain and one receiver antenna chain is tuned to a different frequency channel from the {CH_1, CH_2, ..., CH_K} set. In a simple scenario, the system establishes N parallel communication links (theoretically witRh N times capacity) over frequency channels "CH_1", "CH_2", ..., CH_N" (assuming N is less than or equal to K). Also, in the available frequency band, several pairs of transmit/receive terminals might operate in frequency-bundle mode while several other pairs of terminals operate in MIMO mode. As an example, terminals #1 and #2 can be operating in frequency-bundle mode by occupying frequency channels "CH_1", "CH_2", ..., "CH_N". At the same time, terminals #3 and #4 can be operating in MIMO mode by occupying another single frequency channel (e.g., "CH_{N+1}", assuming N+1 is less than or equal to K).

Figure 4:
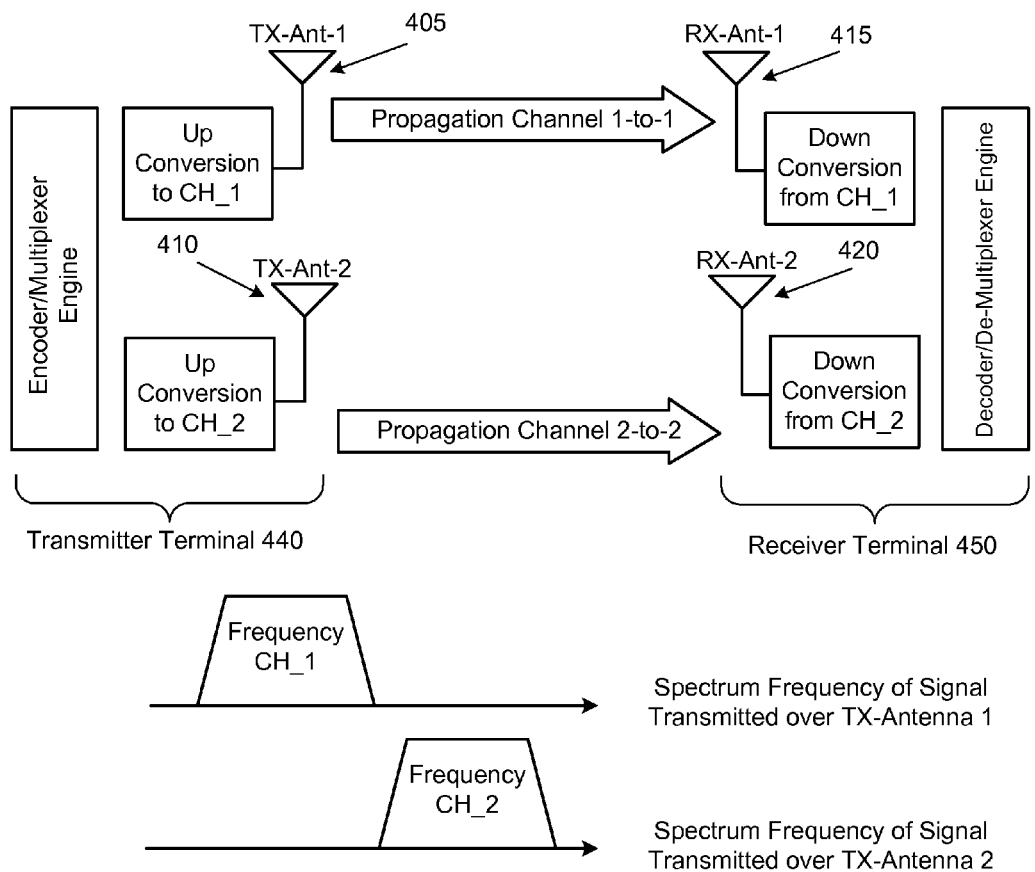
FIG. 4 conceptually illustrates a 2×2 multi-antenna system configured into frequency-bundle mode where a first antenna is transmitting over a first frequency channel while a second antenna is transmitting over a second frequency channel in some embodiments.

FIG. 4 conceptually illustrates a 2×2 multi-antenna system configured into frequency-bundle mode where first antenna 405 is transmitting over frequency channel CH_1 while second antenna 410 is transmitting over frequency channel CH_2 in some embodiments. As shown, the first antenna/chain is transmitting over frequency channel CH_1 while the second antenna/chain is transmitting over frequency channel CH_2. The figure shows one transmitter terminal 440 and one receiver terminal 450. At the receiver side, the first antenna 415 is tuned to CH_1 (receiving only signals from the first transmitter antenna 405) and the second antenna 420 is tuned to CH_2 (receiving only signals from the second transmitter antenna 410). There are no cross connections between the antennas as they are now operating at different frequency channels.

Two data transfer options exists for the frequency-bundle mode in some embodiments: (i) the parallel frequency channels carry independent data and (ii) the information bits are encoded at the transmitter side and the coded bits are split and sent over different frequency channels to exploit frequency diversity. One of ordinary skill in the art would realize that while FIG. 4 shows an example 2×2 configuration a more general configuration with more than two antennas on each transmitter and receiver side is possible.

C. Hybrid Mode

The hybrid mode is a combination of the MIMO and frequency-bundle modes, where a subset of transceiver chains operate concurrently over the same frequency channel (e.g., CH_1) and other subsets of individual transceiver chains operate over different frequency channels (e.g., CH_2, ...). This mode is particularly useful when the number of transmitter chains is not equal to the number of receiver chains, (i.e., M not equal to N). For instance, a 2×3 MIMO system includes a transmitter terminal with 2 transmitter antennas and a receiver terminal with 3 receiver antennas. Depending on system and propagation conditions, transmitter antenna 1 and receiver antennas 1 and 2 can be configured to frequency channel CH_1 (transporting the first data stream), while transmitter antennas 2 and receiver antenna 3 are configured to frequency channel CH_2 (transporting the second data stream).

Figure 5:
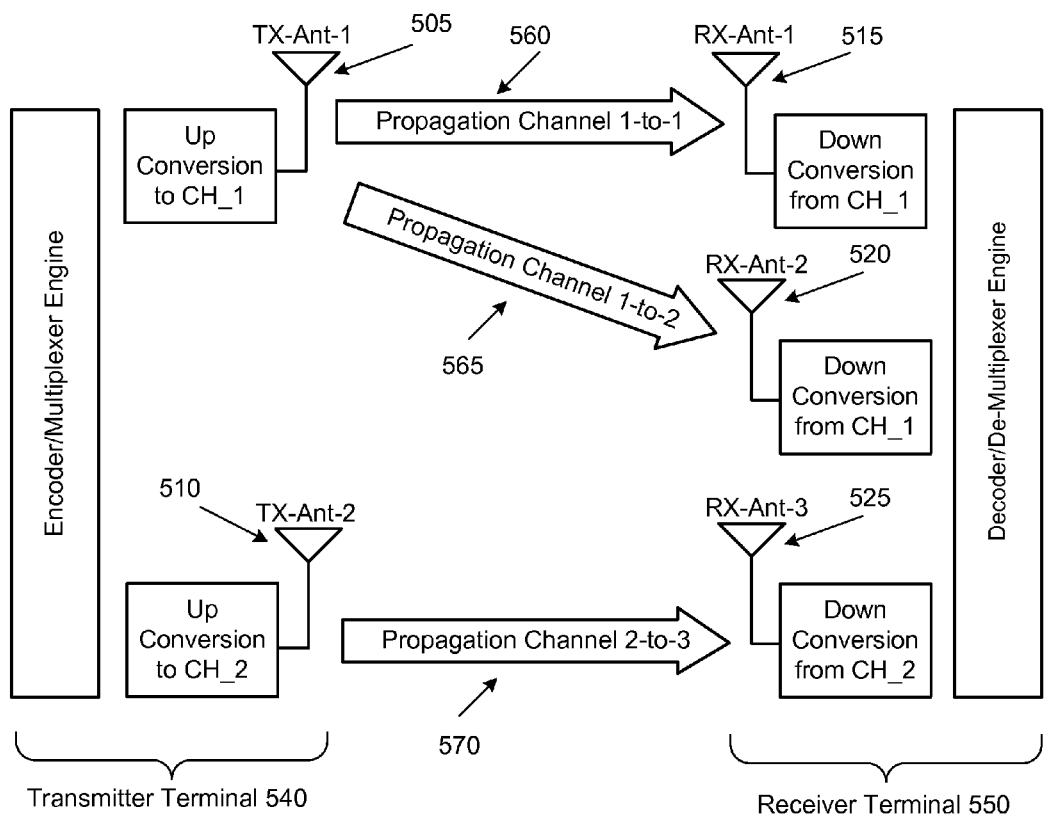
FIG. 5 conceptually illustrates a 2×3 MIMO system that is operating in hybrid mode in some embodiments.
Figure 5:
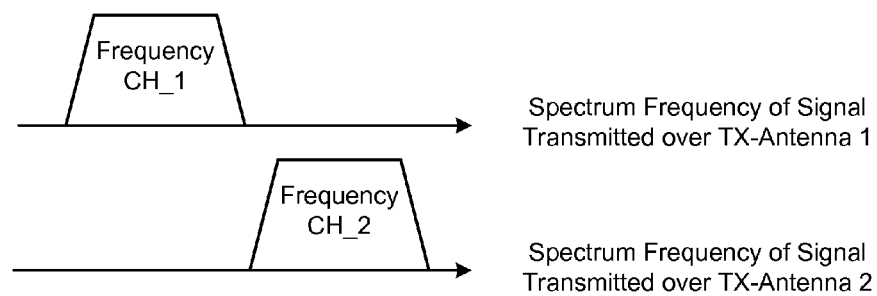

FIG. 5 conceptually illustrates a 2×3 MIMO system that is operating in hybrid mode in some embodiments. As shown, the transmitter terminal 540 includes two antennas 505 and 510 and the receiver terminal includes three antennas 515-525. "Transmitter antenna 1" 505 transmits in frequency channel CH_1 and "transmitter antenna 2" 510 transmits in frequency channel CH_2.

As shown, there are two propagation channels using frequency channel CH_1. "Propagation channel 1-to-1" 560 is between "transmitter antenna 1" 505 and "receiver antenna 1" 515 while "propagation channel 1-to-2" 565 is between "transmitter antenna 1" 505 and "receiver antenna 2" 520. There is also one propagation channel, i.e., "propagation channel 2-to-3" 570 between "transmitter antenna 2" 510 and "receiver antenna 3" 525 that uses frequency channel CH_2.

Figure 6:
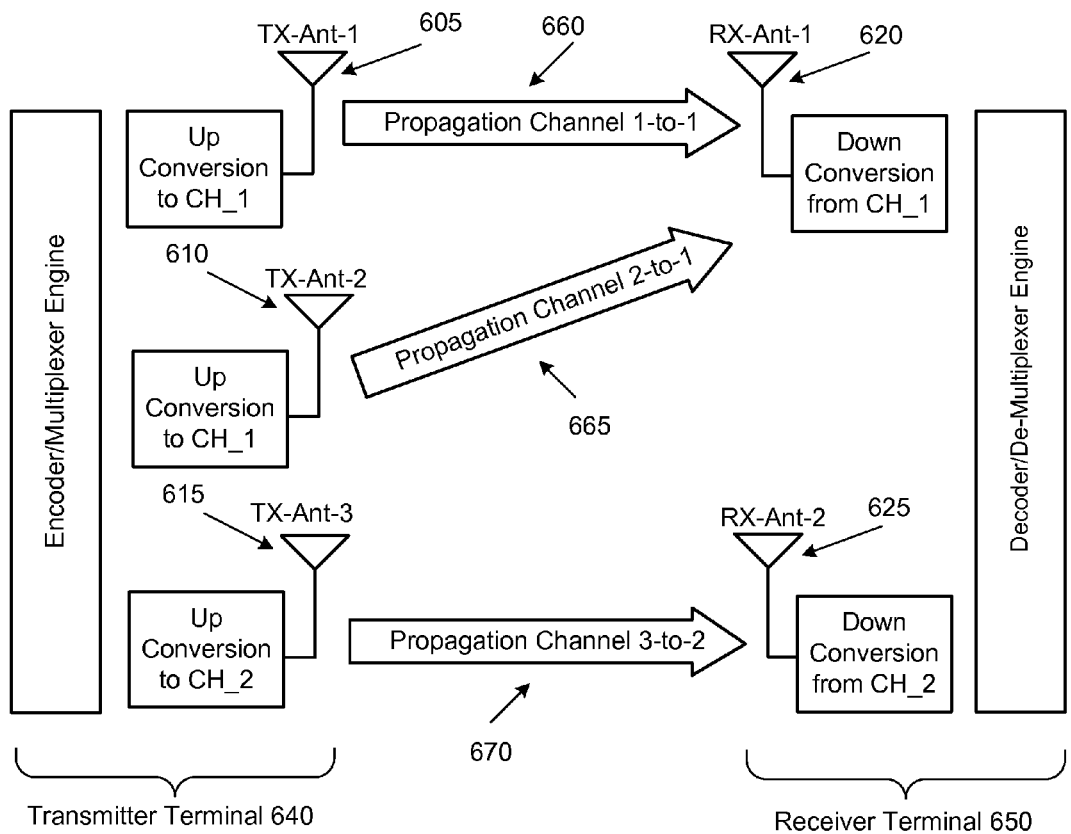
FIG. 6 conceptually illustrates a 3×2 MIMO system that is operating in hybrid mode in some embodiments.
Figure 6:
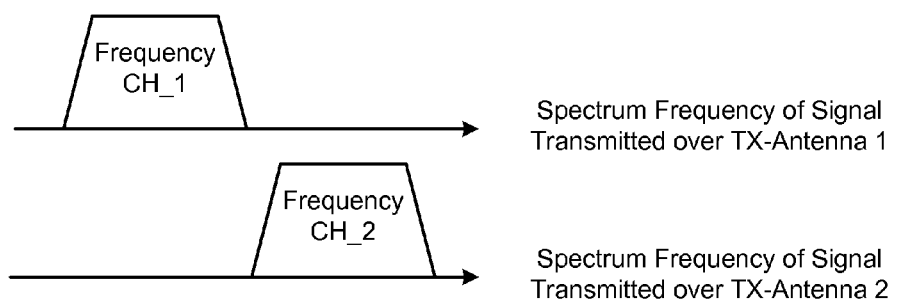

FIG. 6 conceptually illustrates a 3×2 MIMO system that is operating in hybrid mode in some embodiments. As shown, the transmitter terminal 640 includes three antennas 605-615 and the receiver terminal includes two antennas 620 and 625. "Transmitter antenna 1" 605 and "transmitter antenna 2" 610 transmit in frequency channel CH_1 and "transmitter antenna 3" 615 transmits in frequency channel CH_2.

As shown, there are two propagation channels using frequency channel CH_1. "Propagation channel 1-to-1" 660 is between "transmitter antenna 1" 605 and "receiver antenna 1" 620 while "propagation channel 2-to-1" 665 is between "transmitter antenna 2" 610 and "receiver antenna 1" 620. There is also one propagation channel, i.e., "propagation channel 3-to-2" 670 between "transmitter antenna 3" 615 and "receiver antenna 2" 625 that uses frequency channel CH_2. One of ordinary skill in the art would realize that FIGS. 5 and 6 can be generalized to cases of M transmitter antennas and N receiver antennas.

Some embodiments utilize the same hardware (e.g., the same transmitter, up-converter, antenna, encoder/multiplexer, down-converter, decoder/multiplexer, etc.) for operating a terminal in either MIMO, frequency-bundle, or hybrid modes. Specifically, as shown in FIGS. 2-6, the same hardware is used for operating the terminals in each mode.

Similar to the "Frequency-Bundle Mode" in previous sub-section, two data transfer options are utilized in the hybrid mode in some embodiments: (i) the parallel frequency channels carry independent data and (ii) the information bits are encoded at the transmitter side and the coded bits are split and sent over different frequency channels to exploit frequency diversity.

The disclosed system has the capability to switch to full MIMO mode (all transceivers operating in the same frequency channel) when a limited number of frequency channels are available or when other frequency channels are occupied by other user terminals. In this mode maximum performance (throughput, range, reliability, etc.) is achieved by means of MIMO communication schemes (including but not limited to space-time coding, spatial multiplexing, etc.). Space-time coding and spatial multiplexing are MIMO coding techniques where the data streams being transmitted over the multiple TX antennas (and using the same frequency channel) are inter-coded in time and spatial dimensions. These techniques provide spatial diversity (as the same information bit is effectively transmitted over all propagation channels) and enable the receiver terminal to decode and resolve all transmit streams.

In some embodiments, the system has the capability to monitor a set of information elements and switch to frequency-bundle mode when there are idle frequency channels available. In this mode, maximum performance (throughput, range, reliability, etc.) is achieved by means of operating TX/RX antennas/chains concurrently but each at a different frequency channel. In some embodiments the switching between the two modes within a communication system happens dynamically (very fast switching) while in other embodiments the switching happens relatively statically (slow switching).

The rate at which the switching between different modes of operation (MIMO and frequency-bundle) occurs depends on the dynamics of variations in propagation channel and network status (traffic demand, availability of idle frequency channels, etc.) in some embodiment. The configuration of frequency channels assigned to a terminal is changed from time-slot to time-slot (where a group of packets are transmitted in each time-slot) or from packet to packet in some embodiments. The rate of switching between frequency bundle and MIMO modes depends on the rate at which frequency channels become available or unavailable and the rate at which propagation channel conditions change. For instance, if terminal #3 is only requiring frequency channel CH_1 every other time slot, then a pair of terminals #1 and #2 that are communicating with each other can switch to frequency-bundle mode every other slot, when CH_1 is not in use by terminal #3. As another example, when a sub-set of the antennas of terminal #1 are transmitting packets in MIMO mode over frequency channel CH_1 and frequency channel CH_2 becomes available, terminal #1 is configured to operate in frequency-bundle mode in some embodiments and the set of antennas is configured to transmit the rest of the packets in frequency channels CH_1 and CH_2.

II. Switching between Different Modes of Operations

A. Monitoring and Collecting the Network Information and Metrics

Figure 7:
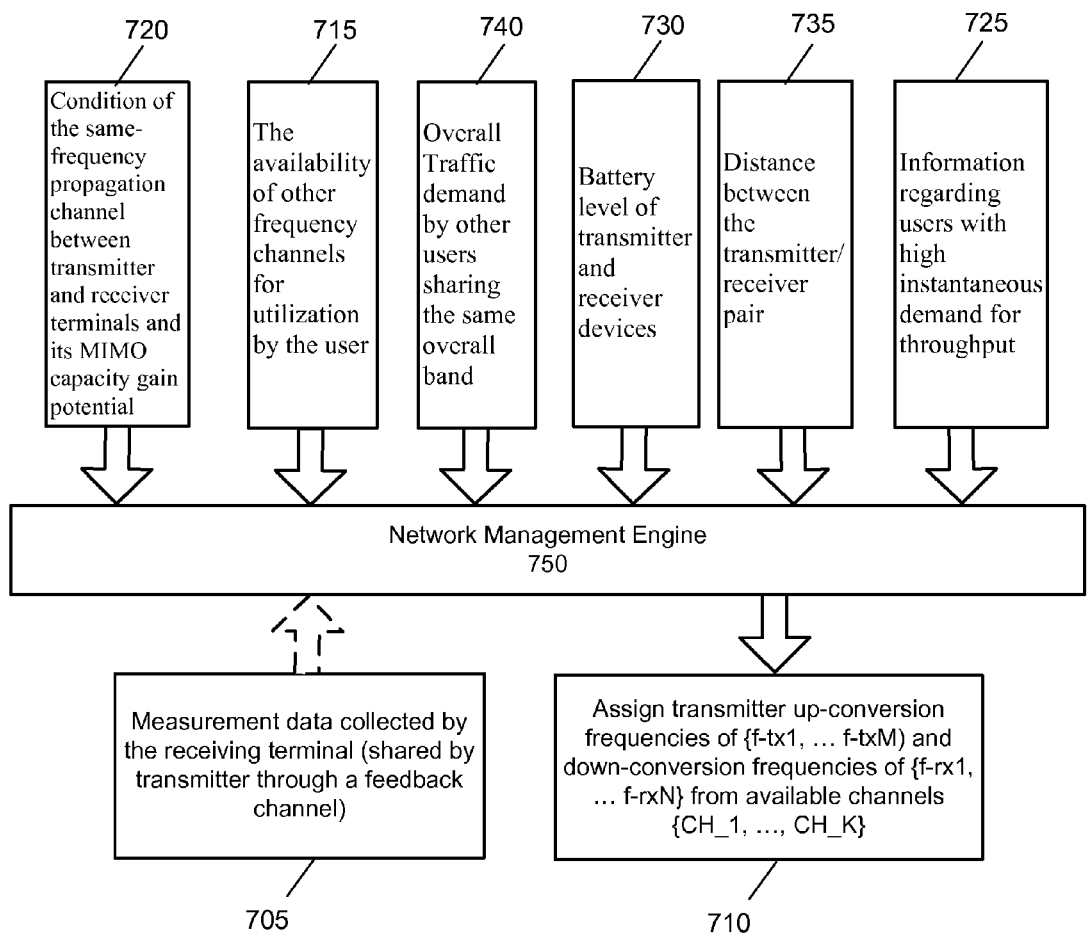
FIG. 7 conceptually illustrates the information and data collected and used for deciding how to plan the frequencies assigned to transmitters and receivers branches in some embodiments.

FIG. 7 conceptually illustrates examples of the information and data collected/used by the network management engine (e.g., by carrier frequency planning engine 250 and/or network management unit 260 shown in FIG. 2) in deciding how to plan the frequencies assigned to transmitters and receivers branches {f-tx1, . . . , f-txM and f-rx1, . . . , f-rxN} in some embodiments. Different boxes in the figure show inflow of different categories of information collected/used by the system to make decisions on MIMO/frequency-bundling configurations. The network management engine 750 receives relevant information, processes them, and decides how to configure (as shown in block 710) the frequencies {f-tx1, . . . , f-txM} and {f-rx1, . . . , f-rxN} based on some optimization criterion (maximum throughput for a terminal, overall average network capacity, power consumption, etc.).

In different embodiments, the network management engine 750 is in the TX side, the RX side, distributed over the TX/RX sides, or some central network coordinator. In the embodiments where the functionality only resides on the TX side, the information required from RX side (such as propagation channel response) is fed back by the RX side to the TX side. This is shown by the dashed arrow from information block 705 to the network management engine 750 in FIG. 7. The following sections describe parameters and inputs that are used by the carrier frequency engine for switching/selecting the modes of operation.

1. Availability of Multiple Frequency Channels for Frequency-bundle Mode

The network management engine continuously monitors (as shown by block 715 information received at the network management engine 750) the interference/usage status on other frequency channels {CH_1, . . . , CH_K} and switches to frequency-bundle mode depending on the number of available frequency channels.

In cellular networks, the network already retains information on the occupancy of frequency channels and their corresponding users/occupiers. In such cases, this information is readily used by the network management engine 750 for decision making. Therefore, switching to frequency-bundle mode depends on the availability of idle frequency channels and overall users' demand for peak throughput and capacity. For instance, when a user is operating in CH_1, the availability of other frequency channels, e.g., {CH_2, . . . , CH_K} are monitored for utilization by the user in frequency-bundle mode.

2. Propagation Channel Conditions and Responses

Certain channel realizations are more suitable for same-channel MIMO operation. They offer higher capacity when MIMO techniques are deployed since they offer higher spectrum efficiency (i.e., bits/sec/Hz). For such propagation channel realizations, the MIMO mode is preferred and selected. Alternatively, the frequency-bundle mode is selected for propagation channel realizations that do not offer significant improvement in MIMO capacity.

MIMO capacity improvement is poor for propagation channel realizations where there is a strong line-of-sight or highly correlated propagation responses on different antennas (especially in less scattered environments). For instance, MIMO capacity is poor when more than a certain number or a certain percentage of propagation channels have direct line of sight or the correlation between the propagation channels is more than a certain threshold.

The threshold for correlation is a programmable parameter in some embodiments. For instance, channels with correlation below a certain threshold value or percentage (e.g., 0.8, 0.7, 0.6, etc.) are considered highly uncorrelated and hence suitable for MIMO operation. Similarly, channels with correlation above a certain threshold value or percentage are considered highly correlated and hence not preferred for MIMO operation. Under these conditions, frequency-bundled mode outperforms MIMO mode and is selected in some embodiments as the operation mode of choice. In some embodiments, this selection is done dynamically and adaptively at the rate that propagation channel conditions vary in real-time. Selection of MIMO and frequency-bundle modes is conducted based on propagation channel conditions (as shown by block 720 information received at the network management engine 750) and is updated as rapidly as channel conditions vary in some embodiments.

For channel conditions that lead to high MIMO and/or spatial multiplexing capacity (e.g., uncorrelated), some embodiments select MIMO mode. In such cases a capacity approaching min (M,N) times SISO capacity is achievable. Alternatively, for channel conditions where MIMO capacity improvement is negligible (e.g., correlated propagation channel), frequency-bundle mode is selected to offer significantly improved throughput. The propagation channel conditions are measured in some embodiments by the receiving terminal and fed back to network management engine 750 as shown by the dashed arrow from information block 705.

3. Request for Peak Throughput by Special Users

MIMO schemes can have limitations in providing and sustaining a very high throughput especially if propagation channel conditions are not supportive. In this case, frequency-bundle mode is selected in some embodiments to provide a very high throughput to certain "selected" users when demanded.

In some embodiments, the network management engine 750 considers demands from users (as shown by block 725) in order to prioritize users with high instantaneous demands for frequency-bundle mode to guarantee higher (e.g., M times) throughput. In other words, the network management engine in some embodiments dynamically boosts the throughput achievable by certain users by switching them to the frequency-bundle mode (tradeoff between throughput per user and overall bandwidth occupancy).

4. Power Consumption Budget

MIMO schemes generally consume more power at the receiver side due to the expensive signal processing needed for MIMO decoding. Switching to frequency-bundle mode reduces the receiver power consumption whenever availability of idle frequency channels allows it.

The allocation of channels to user terminals (switching between MIMO and frequency-bundle modes) in some embodiments is conducted based on the power-consumption budgets of different terminals and whether a terminal has a permanent source of power or operates on battery. In these embodiments, the network management engine 750 receives battery level information of different devices (as shown by the block 730). For users with limited battery power (e.g., terminals without a permanent source of power that have a low battery condition or high power consumption), the network management engine attempts to configure their connections more often in the frequency-bundle mode. This basically lowers the average power consumption for such users by lowering the power-intensive MIMO processing.

5. Distance between Transmitter and Receiver Units

The allocation of frequency channels to user terminals (switching between MIMO and frequency-bundle modes) is conducted based on the distance between the transmitting/receiving sides in some embodiments. In these embodiments, the network management engine 750 receives (as shown by the block 735) the distance between transmitter/receiver pairs and prioritizes the connections with shorter distances for frequency-bundle mode.

For cases that devices are located closely in terms of distance, the frequency-bundle mode would be more preferred for at least two reasons: i) the MIMO mode will more likely be degraded since the propagation channels are more likely to be correlated and ii) at close distances and with power control applied, the two devices can occupy more of spectrum channels while keeping their interference low on other devices in the network.

6. Overall Traffic Demand by Terminals

In some embodiments, the network management engine 750 exploits the overall traffic demand (as shown by the block 740) by the terminals to make decisions between MIMO, frequency-bundle, and hybrid modes. For instance, at times of the day where data traffic demand is generally high, the network management engine configures terminals to operate in MIMO mode. At late night hours when demand for wireless data traffic is low, the network management engine would automatically configure more users to operate in frequency-bundle mode.

B. Processes for Switching between Different Modes of Operation

Figure 8:
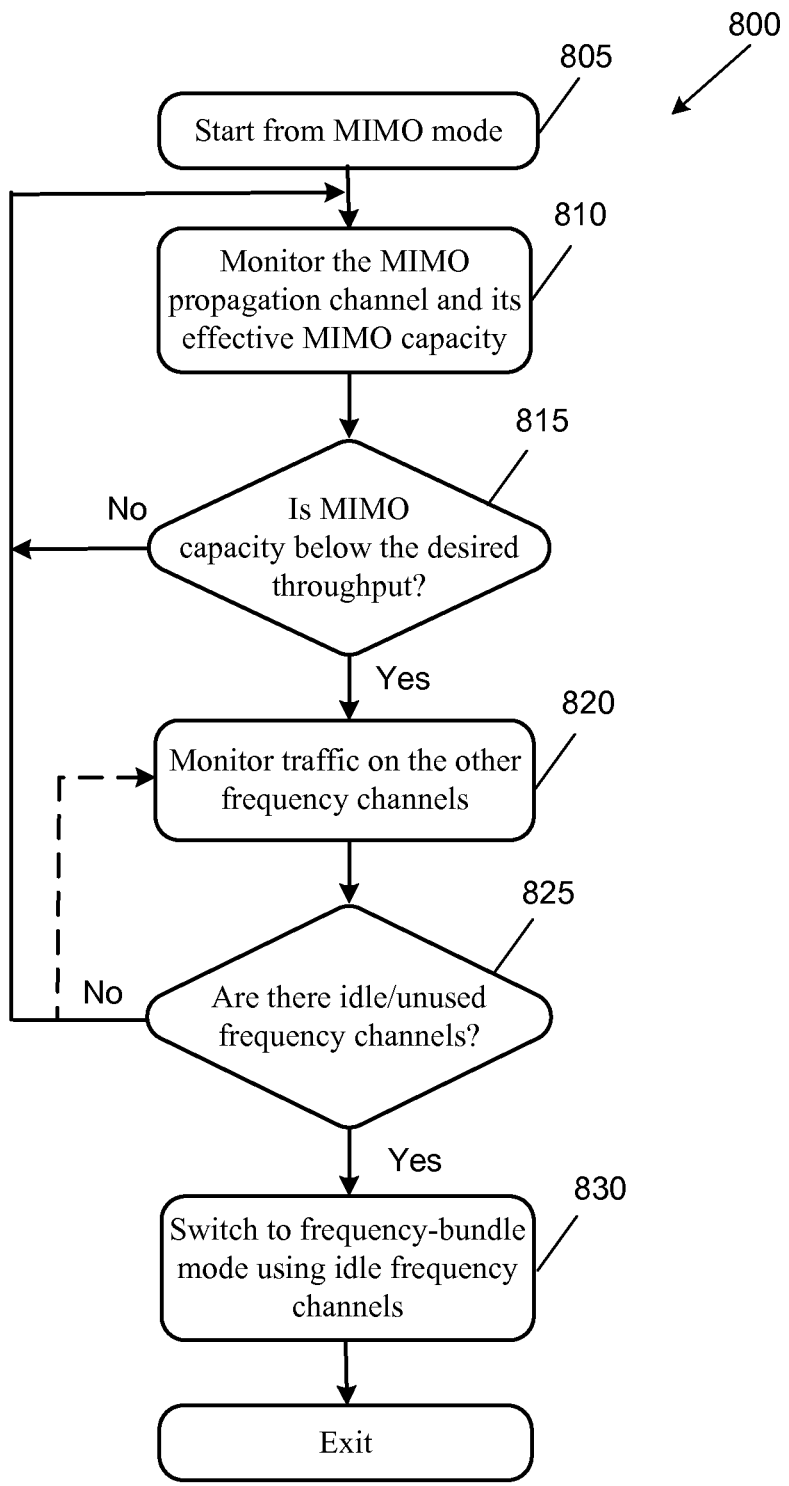
FIG. 8 conceptually illustrates an example of a simplified decision making process for dynamic switching from MIMO mode to frequency-bundle or hybrid modes in some embodiments.
Figure 9:
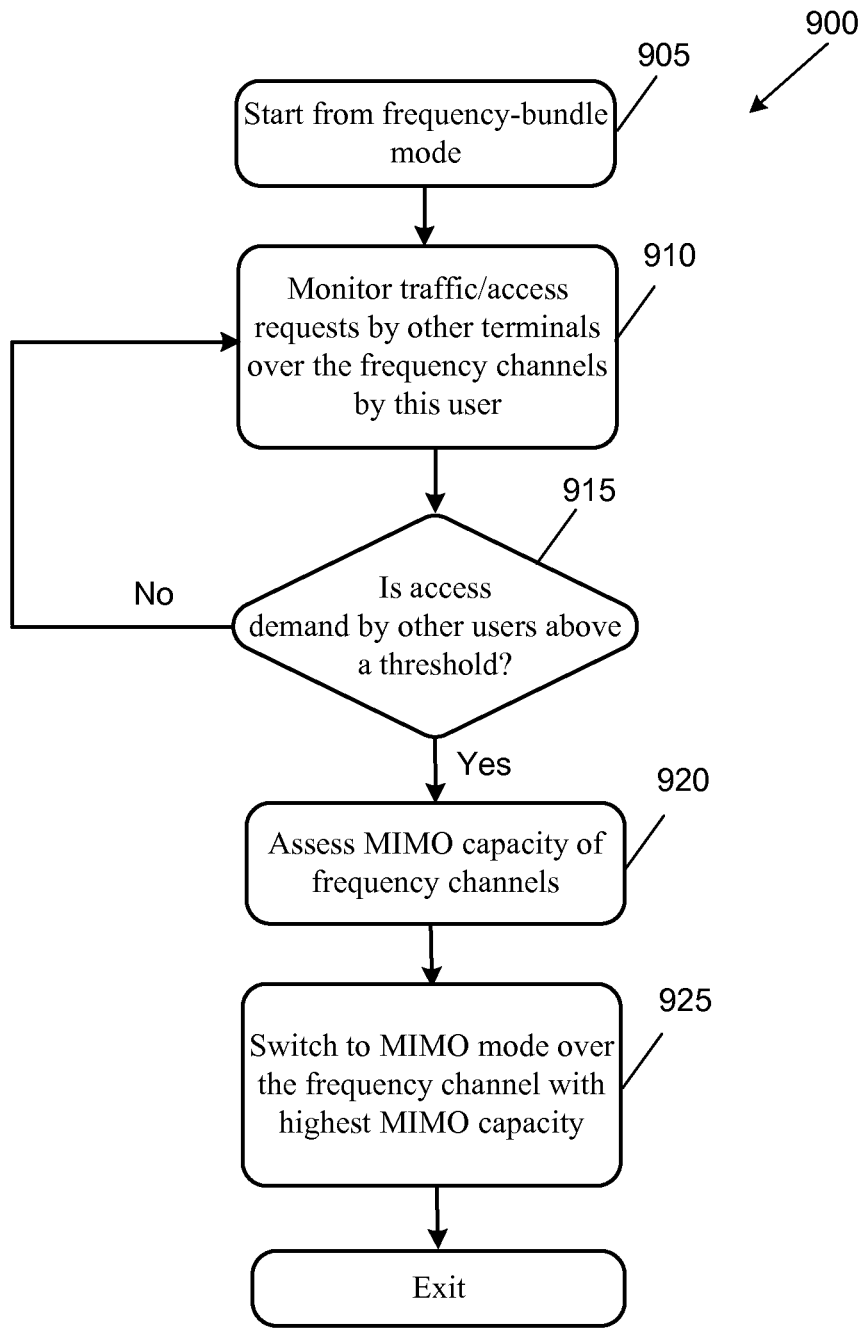
FIG. 9 conceptually illustrates an example of a simplified decision making process for dynamic switching from frequency-bundle or hybrid modes to MIMO mode in some embodiments.

Without loss of generality, FIGS. 8 and 9 show two sample decision making processes used by the network management engine for switching between the different modes of operation. FIG. 8 conceptually illustrates an example of a simplified decision making process 800 by the network management engine for dynamic switching from MIMO mode to frequency-bundle or hybrid modes in some embodiments.

As shown, process 800 starts (at 805) when a pair of terminals operates in MIMO mode. The process in some embodiments controls the mode of operation for a pair of terminals (i.e., a transmitter terminal and a receiver terminal). The process periodically monitors (at 810) the MIMO propagation channel response and the corresponding MIMO capacity and compares it against some programmable threshold (e.g., 70%, 80%, %90, etc., of maximum theoretical MIMO capacity).

Next, the process determines (at 815) whether the MIMO capacity is below the threshold. As long as the capacity achieved in MIMO mode is above the threshold, process 800 proceeds back to 810 and remains in MIMO mode. On the other hand, once the capacity drops below the threshold, the process starts monitoring (at 820) the availability of other frequency channels.

Next, the process determines (at 825) whether there are idle and/or unused frequency channels available. When there are no idle or unused frequency channels available, the process proceed to 810 to continue monitoring the MIMO propagation channel. In some alternative embodiments, when the process determines that MIMO capacity is below the threshold and there are no idle or unused frequency channels, the process proceeds to 820 as shown by the dashed line (instead of proceeding to 810). In these embodiments, the process just continuously monitors for available frequency channels without reassessing the MIMO capacity. When the process determines that other frequency channels are detected to be available, the process switches (at 830) to frequency-bundle mode. The process then exits.

One of ordinary skill in the art will recognize that process 800 is a conceptual representation of the operations used for dynamic switching from MIMO mode to frequency-bundle or hybrid modes. The specific operations of process 800 may not be performed in the exact order shown and described (e.g., operations 820/825 can be performed before operations 810/815). Furthermore, the specific operations of process 800 may not be performed in one continuous series of operations and different specific operations may be performed in different embodiments. Also, the process could be implemented using several sub-processes, or as part of a larger macro process.

FIG. 9 conceptually illustrates an example of a simplified decision making process 900 by the network management engine for dynamic switching from frequency-bundle or hybrid modes to MIMO mode in some embodiments. As shown in FIG. 9, the process starts (at 905) when the communication system operating in frequency-bundle mode. The process periodically monitors (at 910) the access and traffic demand on the frequency channels occupied in frequency-bundle mode.

Next, the process determines (at 915) whether access demand by other users is above a threshold. When the demand is not above the threshold, the process proceeds back to 910 which was described above. Otherwise, when the demand by other users to access these channels is above the programmable threshold, the process assesses (at 920) the MIMO capacity of frequency channels. In switching to MIMO mode, the process in some embodiments selects the single frequency channel for MIMO mode that results in the highest MIMO capacity. This is done through a search procedure over propagation channels corresponding to different frequency channels. For instance, the transmitter terminal would transmit channel sounding waveforms over CH_1, then receiver terminal would measure the corresponding propagation channel response over CH_1. Then MIMO capacity over CH_1 is calculated and recorded. This process is repeated over a set of frequency channels and corresponding MIMO capacities are quantified. Then the frequency channel with a better MIMO capacity is selected when switching back to MIMO mode. Next, the process switches (at 925) to MIMO mode to free up frequency channels for other terminals. The process then exits.

Processes 800 and 900 are examples to demonstrate the decision making process within the network management engine where only "MIMO propagation channel response and capacity" and "availability of frequency channels" are used in the planning process. Several more detailed embodiments are described below.

One of ordinary skill in the art will recognize that process 900 is a conceptual representation of the operations used for dynamic switching from frequency-bundle or hybrid modes to MIMO mode. The specific operations of process 900 may not be performed in the exact order shown and described. Furthermore, the specific operations of process 900 may not be performed in one continuous series of operations and different specific operations may be performed in different embodiments. Also, the process could be implemented using several sub-processes, or as part of a larger macro process.

Figure 10:
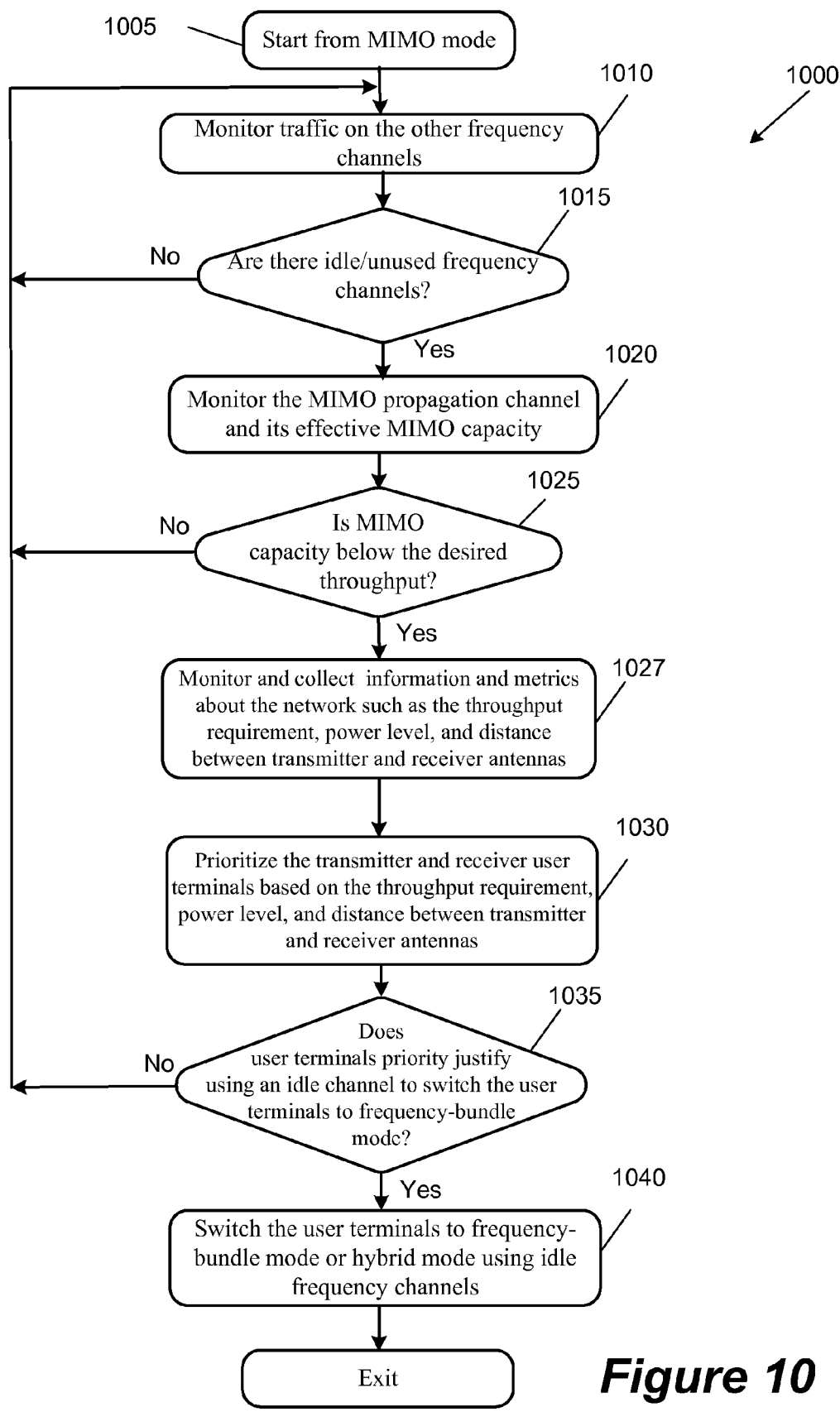
FIG. 10 conceptually illustrates a process for dynamically switching a set of transmitter and receiver terminals from MIMO mode to frequency-bundle or hybrid modes in some embodiments.

FIG. 10 conceptually illustrates a process 1000 for dynamically switching a set of transmitter and receiver terminals from MIMO mode to frequency-bundle mode or hybrid mode in some embodiments. As shown, the process starts (at 1005) when the communication system is operating in MIMO mode. The process then monitors (at 1010) traffic on the other frequency channels. When the process determines (at 1015) that there are no idle or unused frequency channels available, the process proceeds back to 1010. In alternative embodiments, the process proceeds back to 1010 when the process determines (at 1015) whether the number of idle or unused frequency channels is below a threshold.

Otherwise, the process monitors (at 1020) the MIMO propagation channel and its effective MIMO capacity. When the process determines (at 1025) that the MIMO capacity is not below the desired threshold, the process proceeds back to 1010 which was described above. Otherwise, the process monitors and collects (at 1027) information and metrics about the network. The information and metrics include throughput requirement, power level, distance between transmitter and receiver antennas, etc. The process then prioritizes (at 1030) the transmitter and receiver user terminals based on the throughput requirement, power level, and distance between the transmitter and receiver antennas.

The process then determines (at 1035) whether a transmitting and receiving user terminal pair priority justifies using an idle channel to switch the user terminals to frequency-bundle mode or hybrid mode. If not, the process returns to 1010 which was described above. Otherwise, the process (at 1040) either switches all transmitter and receiver antennas to frequency-bundle mode or switches them to hybrid mode in which some of the transmitter and receiver antennas operate in frequency-bundle mode and the other in MIMO mode. The process then exits or in the embodiments where the network management engine is at a central location, continues to monitor other transmit/receive pairs that are operating in MIMO mode.

In some embodiments, process 1000 is performed at TX, RX, or both TX and RX sides of a propagation channel (e.g., by the carrier frequency planning engine 250 of the network management engine). In these embodiments, as shown in FIG. 10, once the process determines (at 1035) that the priority of the transmitter/receiver terminal pair does not justify switching to frequency-bundle or hybrid mode, the process proceeds to 1010. In other embodiments, process 1000 is performed at a central location (e.g., by network management unit 260 of the network management engine). In these embodiments, the process instead of determining (at 1035) whether the priority of a transmitter/receiver terminal pair justifies switching to frequency-bundle or hybrid mode, the process assigns (at 1035) the idle channels to the highest priority transmitter/receiver pairs.

One of ordinary skill in the art will recognize that process 1000 is a conceptual representation of the operations used for dynamically switching transmitter and receiver terminals operating in MIMO mode to either frequency-bundle mode or hybrid mode. The specific operations of process 1000 may not be performed in the exact order shown and described. For instance, operation pairs 1010/1015, 1020/1025, and 1027/1030/1035 can be performed simultaneously or in different orders. Also, operation 1030 might monitor and collect some but not all information and metrics that are listed. Furthermore, the specific operations of process 1000 may not be performed in one continuous series of operations and different specific operations may be performed in different embodiments. Also, the process could be implemented using several sub-processes, or as part of a larger macro process.

Figure 11:
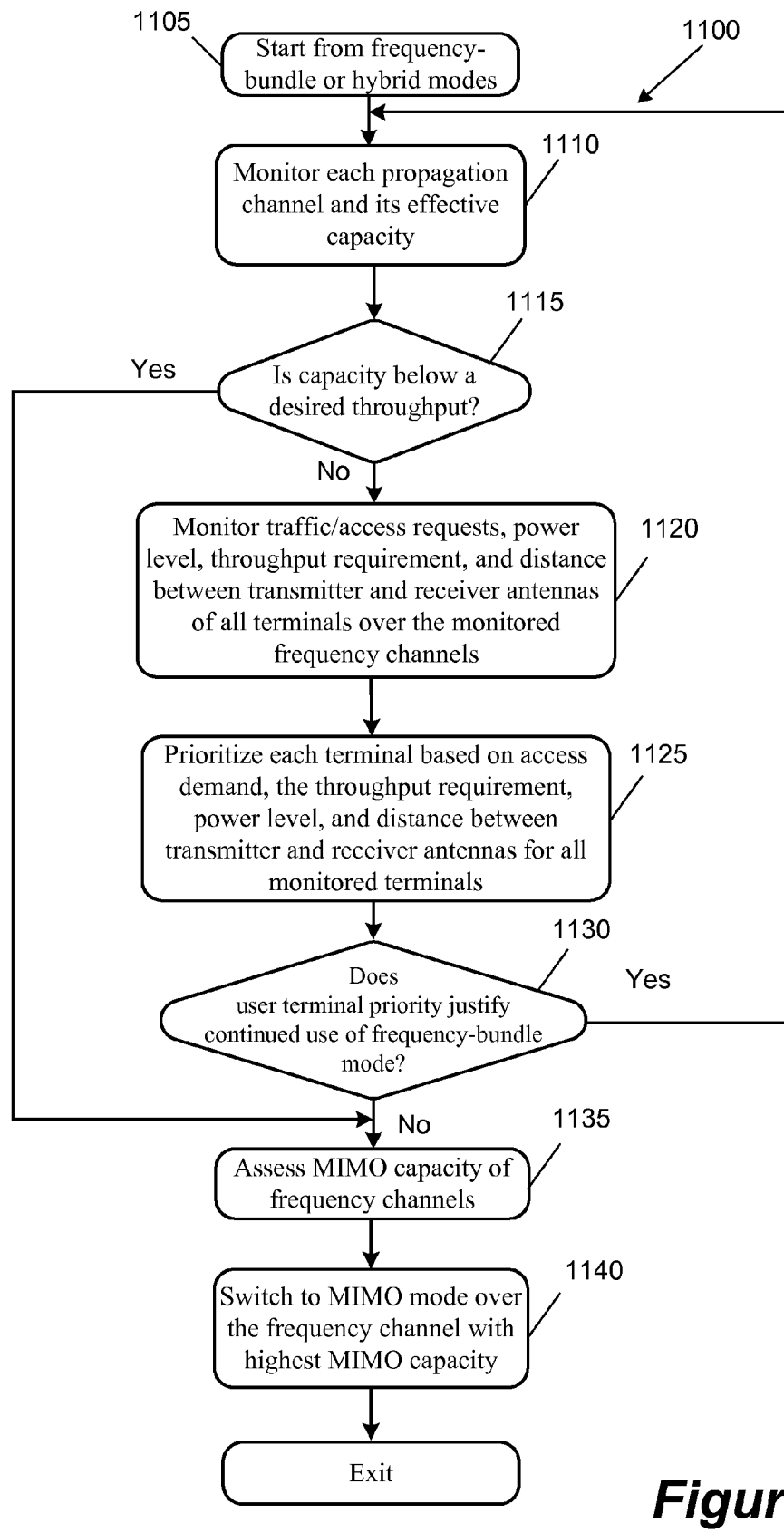
FIG. 11 conceptually illustrates a process for dynamically switching a set of transmitter and receiver terminals operating in frequency-bundle mode or hybrid mode to MIMO mode in some embodiments.

FIG. 11 conceptually illustrates a process 1100 for dynamically switching transmitter and receiver terminals operating in frequency-bundle mode or in hybrid mode to MIMO mode in some embodiments. As shown, the process starts (at 1105) when the transmitter and receiver terminals are operating in either frequency-bundle mode or hybrid mode. The process monitors (at 1110) each propagation channel and its effective capacities.

The process then determines (at 1115) whether the capacity of any propagation channel is below a desired threshold. If so, the process proceeds to 1135 which is described below. Otherwise, the process monitors (at 1120) the traffic and/or access requests, power level, throughput requirement, and distance between transmitter and receiver antennas of all terminals over the monitored frequency channels.

The process then prioritizes (at 1125) each terminal based on access level demand, the throughput requirement, power level, distance between transmitter and receiver antennas, etc., for all monitored terminals. The process then determines (1130) whether a monitored terminal priority justifies continued use of frequency-bundle mode. If yes, the process proceeds back to 1110 which was described above.

Otherwise, the process assesses (1135) the MIMO capacity of the frequency channels. In switching to MIMO mode, the process in some embodiments selects the single frequency channel for MIMO mode that results in the highest MIMO capacity. This is done through a search procedure over propagation channels corresponding to different frequency channels. For instance, the transmitter terminal would transmit channel sounding waveforms over CH_1, then receiver terminal would measure the corresponding propagation channel response over CH_1. Then MIMO capacity over CH_1 is calculated and recorded. This process is repeated over a set of frequency channels and corresponding MIMO capacities are quantified. Then the frequency channel with a better MIMO capacity is selected when switching back to MIMO mode. The process then switches (at 1140) to MIMO operating mode over the frequency channel with the highest MIMO capacity. The process then exits or in the embodiments where the network management engine is at a central location, continues to monitor other transmit/receive pairs that are operating in frequency-bundle or in hybrid mode.

In some embodiments, process 1100 is performed at TX, RX, or both TX and RX sides of a propagation channel (e.g., by the carrier frequency planning engine 250 of the network management engine). In these embodiments, as shown in FIG. 11, once the process determines (at 1130) that the priority of the transmitter/receiver terminal pair justifies continued use of frequency-bundle mode or hybrid mode, the process proceeds to 1110. In other embodiments, process 1100 is performed at a central location (e.g., by network management unit 260 of the network management engine). In these embodiments, the process instead of determining (at 1130) whether the priority of a particular transmitter/receiver terminal pair justifies continued use of frequency-bundle or hybrid mode, the process switches (at 1135 and 1140) the lowest priority transmitter/receiver pairs to MIMO until the capacity goes above the desired threshold.

One of ordinary skill in the art will recognize that process 1100 is a conceptual representation of the operations used for dynamically switching transmitter and receiver terminals operating in frequency-bundle mode or in hybrid mode to MIMO mode. The specific operations of process 1100 may not be performed in the exact order shown and described. For instance, monitoring traffic/access requests, etc., (at 1120) can be done at the same time as monitoring the propagation channel (at 1110). Also, operation 1120 might monitor and collect some but not all information and metrics that are listed. Furthermore, the specific operations of process 1100 may not be performed in one continuous series of operations and different specific operations may be performed in different embodiments. Also, the process could be implemented using several sub-processes, or as part of a larger macro process.

C. System-Level Features and Configurations

Same set of transceiver chains used for MIMO communication are utilized for frequency-bundle mode and hybrid mode in some embodiments. Radio and mixed signal components (low noise amplifier (LNA), mixers, filters, analog to digital convertors (ADCs), power amplifiers (PAs), digital to analog converters (DACs), etc.) are reused when switching between the modes. The terminals in transmission mode reuse the encoder and/or multiplexer engine, the transmitters, the up-converters, digital to analog converters (DACs), filters, and the antennas. Similarly, the terminals in reception mode reuse the decoder and/or de-multiplexer engine, the receivers, the down-converters, analog to digital convertors (ADCs), filters, and the antennas when switching between the modes. Switching between the modes is enabled by reusing the same radio and mixed signal components. For MIMO mode, only one carrier frequency is needed and hence requiring only one synthesizer output. Multiple carrier frequencies are needed for frequency-bundle and hybrid modes, hence requiring a synthesizer with multiple output frequencies.

The disclosed embodiments are applied to both unlicensed (such as Wi-Fi networks) and licensed frequency bands (such as cellular networks). For unlicensed bands, the frequency-bundle mode in some embodiments is utilized dynamically as more frequency channels become available (discovered through carrier sensing or other means). For licensed bands, the network management engine in some embodiments arranges for switching to frequency-bundle mode depending on the number of active users, overall capacity demand (time of the day/week), peak throughput demand, and propagation channel conditions. As examples, this band of operation could be licensed (e.g., third generation (3G), fourth generation (4G), long term evolution (LTE), Worldwide Interoperability for Microwave Access (WiMax) networks, wireless broadband networks, etc.) or unlicensed (e.g., 2.4 GHz and 5 GHz wireless local area network (LAN) systems, millimeter wave (mmWave) networks, etc.)

When frequency-bundle mode of operation is selected, additional coding is used over the streams transporting over multiple frequency channels in some embodiments. While independent data streams can be sent over TX/RX branches (with each operating on a different frequency channel) as a simple configuration, some coding over multiple streams is applied in some embodiments for further improvement. The purpose of this coding is to exploit frequency diversity inherent in multiple frequency channels. In essence, the information bits are encoded at the transmitter side and the encoded bits are split and sent over different frequency channels to exploit frequency diversity. For instance, assume 10 information bits are to be transmitted over. If no-additional coding is used, the 10 bits are split into 2 sets of 5 bits. Each set of 5 bits is then transmitted over one pair of TX/RX branches, each over a different frequency channel. In this case, each set of 5 bits is transmitted independently. If additional coding is used, the 10 bits are first encoded (thereby adding redundancy) to generate for example 20 coded bits. These 20 bits are then split into two groups, and each set of 10 coded bits is transmitted using one pair of TX/RX branches and over a different frequency channel. The advantage of using additional coding is that even if one set of encoded 10 bits experiences a poor propagation channel over one channel frequency, the original 10 information bits are still recovered if the second group of transmitted encoded bits experiences a good propagation channel.

To aid the terminals with measuring the propagation channel response and assessing availability of idle frequency channels, the transceiver resources of the terminals is utilized in some embodiments. For MIMO propagation channel measurements, the transmitter side in some embodiments transmits training signals in MIMO mode over CH_1. The receiver side then measures the propagation channel response (e.g., by using any well-known technique in the art for measuring the propagation channel response) and shares that with the network management engine at a central location and/or at the transmitter side. The network management engine then uses this information to calculate and assess the MIMO channel capacity and decide on the mode of operation.

For assessing the availability of idle frequency channels, both sides in some embodiments tune in their receiver branches to different frequency channels of {CH_1, CH_2, . . . , CH_K} to monitor whether those channels are in use by other terminals (e.g., by monitoring the signal power over all frequency channels to determine whether the signal power over a frequency channel is below a threshold). In some embodiments, one antenna is used for sensing the availability of additional frequency channels. For instance, when there are N receive antennas for MIMO reception in some embodiments, the terminal uses N−1 antennas for MIMO reception and uses the remaining single antenna for sensing availability of other frequency channel for possible switch to frequency-bundle when frequency channels become available. This information is then used by the network management engine to decide on mode of operation. All terminals in some embodiments send their collected information to a central network management unit. The central management unit maintains and updates this data in a central database. This central database is then used to help control modules of the network management engine in different terminals to improve their decision making processes.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A method of configuring a communication system operating on a frequency band divided into a plurality of frequency channels, the communication system comprising a transmitter terminal comprising a plurality of antennas and a receiver terminal comprising a plurality of antennas, the method comprising:
   monitoring a set of metrics for the communication system;
   configuring the transmitter and receiver terminals to communicate with each other in a first mode of operation when the set of metrics meet a first set of criteria, wherein in the first mode of operation all antennas of the transmitter terminal and all antennas of the receiver terminal operate over a first frequency channel in the plurality of frequency channels; and
   configuring the transmitter and receiver terminals to communicate with each other in a hybrid second mode of operation when the set of metrics meet a second set of criteria, wherein in the hybrid second mode of operation (i) a first antenna of the transmitter terminal and a first antenna of the receiver terminal to communicate with each other over the first frequency channel and (ii) a set of antennas compromising at least a second antenna in the plurality of antennas of the transmitter terminal and a set of antennas comprising at least a second antenna and a third antenna in the plurality of antennas of the receiver terminal communicate with each other over a second frequency channel in the plurality of frequency channels, wherein the first frequency channel is different than the second frequency channel.

2. The method of claim 1, wherein the set of metrics comprises a number of idle frequency channels in the plurality of frequency channels, wherein the transmitter and receiver terminals are configured to communicate in the first mode of operation when the number of idle frequency channels are below a threshold, wherein the transmitter and receiver terminals are configured to communicate in the second first mode of operation when the number of idle frequency channels is not below said threshold.

3. The method of claim 2, wherein a particular frequency channel is idle when a signal power over the particular frequency channel is below a threshold.

4. The method of claim 1, wherein the set of metrics comprises a capacity of a plurality of propagation channels between communicating antennas of the transmitter and receiver terminals, wherein the transmitter and receiver terminals are configured to communicate in the first mode of operation when the capacity of the plurality of propagation channels is below a threshold, wherein the transmitter and receiver terminals are configured to communicate in the second mode of operation when the capacity of the plurality of propagation channels is not below the threshold.

5. The method of claim 4, wherein said capacity depends on whether a line-of-sight exits between one or more antennas of the transmitter terminal and one or antennas of the receiver terminal.

6. The method of claim 4, wherein said capacity depends on whether said plurality of propagation channels are correlated, wherein the transmitter and receiver terminals are configured to operate in the second mode of operation when said correlation is over a threshold, wherein the transmitter and receiver terminals are configured to operate in the first mode of operation when said correlation is not over the threshold.

7. The method of claim 4 wherein monitoring the capacity comprises:
   transmitting training signals by the transmitter terminal when operating in the first mode of operation;
   measuring a response of a propagation channel in first frequency channel; and
   utilizing said measured response to determine the capacity of the propagation channel in the first frequency channel, wherein configuring the transmitter and receiver terminals to communicate with each other in the first mode of operation comprises utilizing the measured capacity to configure the terminals, wherein configuring the transmitter and receiver terminals to communicate with each other in the second mode of operation comprises utilizing the measured capacity to configure the terminals.

8. The method claim 1, wherein a plurality of terminals comprising said transmitter terminal and said receiver terminal operate over the plurality of frequency channels, wherein the set of monitored metrics comprises a battery life of each terminal in the plurality of terminals, the method further comprising:

assigning priorities to terminals based on the battery life of each terminal, wherein a terminal with a lower battery life is assigned a higher priority; and configuring higher priority terminals to operate in the second mode of operation when idle frequency channels become available.

9. The method claim 1, wherein a plurality of terminals comprising said transmitter terminal and said receiver terminal operate over said plurality of frequency channels, wherein the set of monitored metrics comprises a power consumption of each terminal in the plurality of terminals, the method further comprising:

assigning priorities to terminals based on the power consumption and a source of power of each terminal, wherein terminals without permanent sources of power are assigned higher priorities than terminals with permanent sources of power, wherein a terminal operated without a permanent source of power and with a higher power consumption is assigned a higher priority than a terminal operated without a permanent source of power and with a lower power consumption; and configuring higher priority terminals to operate in the second mode of operation when idle frequency channels become available.

10. The method claim 1, wherein a plurality of terminal pairs that communicate with each other, the plurality of terminal pairs comprising a pair compromising said transmitter terminal said receiver terminal operate over said plurality of frequency channels, wherein the set of monitored metrics comprises throughput demands by each terminal in the plurality of terminal pairs, the method further comprising:

assigning higher priorities to terminal pairs with higher throughputs than terminal pairs with lower throughputs, and configuring higher priority terminal pairs to operate in the second mode of operation when idle frequency channels become available.

11. The method claim 1, wherein a plurality of terminal pairs that communicate with each other, the plurality of terminal pairs comprising a pair comprising said transmitter terminal and said receiver terminal operate over said plurality of frequency channels, wherein the set of monitored metrics comprises a distance between a pair of transmitter and receiver terminals that communicate with each other, the method further comprising:

assigning higher priorities to pairs of terminals that are closer to each other than pairs of terminals that are farther from each other, and configuring higher priority pairs of communicating terminals to operate in the second mode of operation when idle frequency channels become available.

12. The method of claim 1, wherein the transmitter terminal utilizes a same set of hardware resources when operating in the first mode of operation and when operating in the second mode of operation, wherein the receiver terminal utilizes a same set of hardware resource when operating in the first mode of operation and when operating in the second mode of operation.

13. The method of claim 12, wherein the set of hardware resource utilized by the transmitter terminal comprises a set of low noise amplifiers, a set of power amplifiers, a set of digital to analog converters, and a set of analog to digital converters, wherein the set of hardware resource utilized by the receiver terminal comprises a set of low noise amplifiers, a set of power amplifiers, a set of digital to analog converters, and a set of analog to digital converters.

14. The method of claim 12, wherein the set of hardware resource utilized by the transmitter terminal comprises an encoder engine, a plurality of transmitters, a plurality of up-converters, and said plurality of transmitter terminal antennas, wherein the set of hardware resource utilized by the receiver terminal comprises a decoder engine, a plurality of receivers, a plurality of down-converters, and said plurality of receiver terminal antennas.

15. The method of claim 1 further comprising:
when operating in the second mode of operation:
encoding information bits to be transmitted by the transmitter terminal; and
splitting the encoded information bits into separate streams for transmission over the first and second frequency channels.

16. The method of claim 1, wherein the frequency band operated by the communication system is one of a licensed frequency band and an unlicensed frequency band.

17. The method of claim 1, wherein the communication system is one of a third generation (3G), fourth generation (4G), long term evolution (LTE), Worldwide Interoperability for Microwave Access (WiMax) networks, wireless broadband, wireless local area network (LAN), and millimeter wave (mmWave) communication systems.

18. The method of claim 1, wherein the transmitter and receiver terminals are configured to share the second frequency channel with a plurality of other terminals, wherein the transmitter and receiver terminals are configured to dynamically switch operating in the first and second modes of operation, wherein said dynamically switching comprises (i) operating in the first mode of operation in a plurality of time-slots when the second frequency channel is not available and (ii) operating in the second mode of operation in a plurality of time-slots when the second frequency channel is available.

19. A communication system operating on a frequency band divided into a plurality of frequency channels, the communication system comprising:

a transmitter terminal comprising a plurality of antennas;
a receiver terminal comprising a plurality of antennas; and
a set of controllers configured to:
monitor a set of metrics for the communication system,
configure the transmitter and receiver terminals to communicate with each other in a first mode of operation when the set of metrics meet a first set of criteria, wherein in the first mode of operation all antennas of the transmitter terminal and all antennas of the receiver terminal operate over a first frequency channel in the plurality of frequency channels, and
configure the transmitter and receiver terminals to communicate with each other in a hybrid second mode of operation when the set of metrics meet a second set of criteria, wherein in the hybrid second mode of operation (i) a first antenna of the transmitter terminal and a first antenna of the receiver terminal to communicate with each other over the first frequency channel and (ii) a set of antennas comprising at least a second antenna and a third antenna in the plurality of antennas of the transmitter terminal and a set of antennas comprising at least a second antenna in the plurality of antennas of the receiver terminal communicate with each other over a second frequency channel in the plurality of frequency channels, wherein the first frequency channel is different than the second frequency channel.

20. The communication system of claim 19, wherein the set of controllers comprises a controller at the transmitter terminal configured to configure the transmitter terminal to operate in one of the first and second modes of operation, wherein the set of controllers further comprises a controller at the receiver terminal configured to configure the receiver terminal to operate in one of the first and second modes of operation.

21. The communication system of claim 19, wherein the set of controllers comprises:
   a central controller configured to collect a first sub-set of said set of metrics; and
   a controller at the receiver terminal configured to (i) collect a second sub-set of said set of metrics and (ii) transmit the second sub-set to the central controller through a feedback communication channel.

22. The communication system of claim 19, wherein the set of metrics comprises a number of idle frequency channels in the plurality of frequency channels, wherein the transmitter and receiver terminals are configured to communicate in the first mode of operation when the number of idle frequency channels are below a threshold, wherein the transmitter and receiver terminals are configured to communicate in the second first mode of operation when the number of idle frequency channels is not below said threshold.

23. The communication system of claim 19, wherein the set of metrics comprises a capacity of a plurality of propagation channels between communicating antennas of the transmitter and receiver terminals, wherein the transmitter and receiver terminals are configured to communicate in the first mode of operation when the capacity of the plurality of propagation channels is below a threshold, wherein the transmitter and receiver terminals are configured to communicate in the second mode of operation when the capacity of the plurality of propagation channels is not below the threshold.

24. The communication system claim 19, wherein a plurality of terminals comprising said transmitter terminal and said receiver terminal operate over the plurality of frequency channels, wherein the set of monitored metrics comprises a battery life of each terminal in the plurality of terminals, wherein the set of controllers are further configured to:
   assign priorities to terminals based on the battery life of each terminal, wherein a terminal with a lower battery life is assigned a higher priority; and
   configure higher priority terminals to operate in the second mode of operation when idle frequency channels become available.

25. The communication system claim 19, wherein a plurality of terminals comprising said transmitter terminal and said receiver terminal operate over said plurality of frequency channels, wherein the set of monitored metrics comprises a power consumption of each terminal in the plurality of terminals, wherein the set of controllers are further configured to:
   assign priorities to terminals based on the power consumption and a source of power of each terminal, wherein terminals without permanent sources of power are assigned higher priorities than terminals with permanent sources of power, wherein a terminal operated without a permanent source of power and with a higher power consumption is assigned a higher priority than a terminal operated without a permanent source of power and with a lower power consumption; and
   configure higher priority terminals to operate in the second mode of operation when idle frequency channels become available.

26. The communication system claim 19, wherein a plurality of terminal pairs that communicate with each other, the plurality of terminal pairs comprising a pair comprising said transmitter terminal and said receiver terminal operate over said plurality of frequency channels, wherein the set of monitored metrics comprises throughput demands by each terminal in the plurality of terminal pairs, wherein the set of controllers are further configured to:
   assign higher priorities to terminal pairs with higher throughputs than terminal with lower throughputs, and
   configure higher priority terminal pairs to operate in the second mode of operation when idle frequency channels become available.

27. The communication system claim 19, wherein a plurality of terminal pairs that communicate with each other, the plurality of terminal pairs comprising a pair comprising said transmitter terminal and said receiver terminal operate over said plurality of frequency channels, wherein the set of monitored metrics comprises a distance between a pair of transmitter and receiver terminals that communicate with each other, wherein the set of controllers are further configured to:
   assign higher priorities to pairs of terminals that are closer to each other than pairs of terminals that are farther from each other, and
   configure higher priority pairs of communicating terminals to operate in the second mode of operation when idle frequency channels become available.

28. The communication system claim 19, wherein the transmitter terminal utilizes a same set of hardware resources when operating in the first mode of operation and when operating in the second mode of operation, wherein the receiver terminal utilizes a same set of hardware resource when operating in the first mode of operation and when operating in the second mode of operation.

29. The communication system claim 19, wherein when operating in the second mode of operation the transmitter terminal is further configured to:
   encode information bits to be transmitted; and
   split the encoded information bits into separate streams for transmission over the first and second frequency channels.

30. The communication system 19, wherein the frequency band operated by the communication system is one of a licensed frequency band and an unlicensed frequency band.

31. The communication system 19, wherein the transmitter and receiver terminals are configured to share the second frequency channel with a plurality of other terminals, wherein the transmitter and receiver terminals are configured to dynamically switch operating in the first and second modes of operation, wherein said dynamically switching comprises (i) operating in the first mode of operation in a plurality of time-slots when the second frequency channel is not available and (ii) operating in the second mode of operation in a plurality of time-slots when the second frequency channel is available.

32. The communication system of 19, wherein in the hybrid second mode of operation said set of antennas of the receiver terminal further comprises a third antenna, wherein said set of antennas of the transmitter terminal further communicates with the third antenna in the set of antennas of the receiver terminal over the second frequency channel.

33. The method of claim 1, wherein in the hybrid second mode of operation said set of antennas of the transmitter terminal further comprises a third antenna, wherein said set of antennas of the receiver terminal further communicates with said third antenna in the set of antennas of the transmitter terminal over the second frequency channel.

* * * * *